Oct. 22, 1963 R. O. DAVIS 3,107,410
BLOCK MOLDING MACHINE
Filed July 28, 1961 5 Sheets-Sheet 2

INVENTOR.
ROBERT O. DAVIS
BY
OLSEN AND STEPHENSON
ATTORNEYS

Oct. 22, 1963   R. O. DAVIS   3,107,410
BLOCK MOLDING MACHINE
Filed July 28, 1961   5 Sheets-Sheet 4

INVENTOR.
ROBERT O. DAVIS
BY
OLSEN AND STEPHENSON
ATTORNEYS

Oct. 22, 1963    R. O. DAVIS    3,107,410
BLOCK MOLDING MACHINE
Filed July 28, 1961    5 Sheets-Sheet 5

INVENTOR.
ROBERT O. DAVIS
BY
OLSEN AND STEPHENSON
ATTORNEYS

United States Patent Office 3,107,410
Patented Oct. 22, 1963

3,107,410
BLOCK MOLDING MACHINE
Robert O. Davis, Adrian, Mich., assignor to The Gene Olsen Corporation, Adrian, Mich., a corporation of Michigan
Filed July 28, 1961, Ser. No. 127,631
6 Claims. (Cl. 25—41)

This invention relates generally to concrete block molding machines and more particularly to an improved molding machine of this type having quality control apparatus thereon for insuring the production of blocks of uniform size and density.

In a concrete block making machine of the type to which this invention relates, an open bottom feed drawer continuously reciprocates between a charging position in which it receives the concrete mix from a hopper, and a discharging position in which it discharges the mix into an open top mold. Ordinarily, the mix will vary somewhat in density during the continuous operation of a machine, so that if no provision is made for this variation, the density and therefore the quality of the molded blocks will also vary. Additionally, the time required for the machine to compact the concrete in the mold to a predetermined size will also vary when the density of the mixes in the mold varies.

It is an object of this invention, therefore, to provide a block making machine having improved quality control apparatus which automatically provides for adjustment of the feed drawer to vary the volume of mix discharged into the mold to compensate for variations in the mix density to thereby obtain a desired uniform production rate of the machine to produce blocks of a predetermined uniform size and quality.

A further object of this invention is to provide an improved machine having quality control apparatus of the above type in which the distribution of the mix in the mold is not affected by the adjustment of the machine to maintain a desired quality, thereby insuring the production of blocks each of which is of substantially uniform strength and quality throughout.

Still a further object of this invention is to provide an improved block making machine having quality control apparatus in which the spillage of material under and around the machine is maintained at a minimum.

Further objects, features and advantages of this invention will become apparent from a consideration of the following description, the appended claims, and the accompanying drawing in which:

FIGURE 3 is a vertical sectional view of the machine of this invention looking substantially along the line 3—3 in FIG. 2, illustrating the feed drawer in a charging position and the pressure head in a lowered position within the mold for compacting the material in the mold;

FIGURE 4 is a vertical sectional view of the machine of this invention, illustrated similarly to FIG. 3, showing the feed drawer in its forwardly moved discharging position in which the contents of the feed drawer are emptied into the mold and showing the pressure head in a raised position above the mold;

Figure 1:
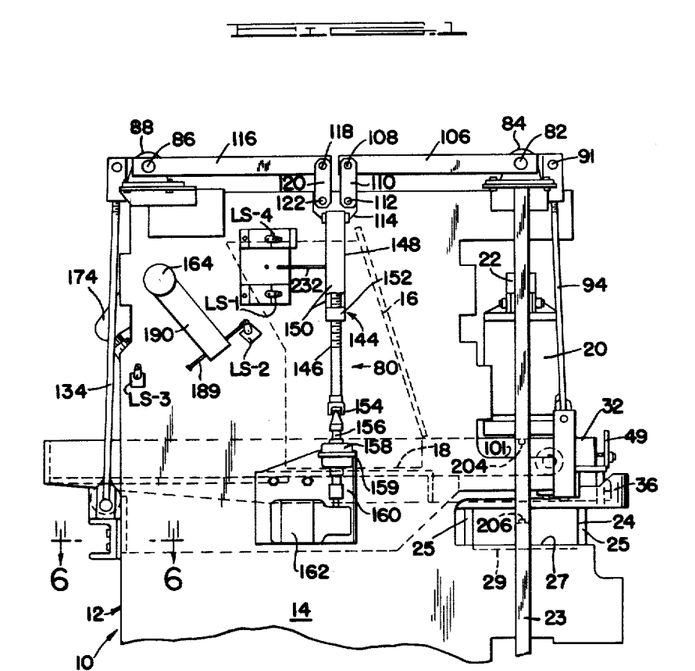
FIGURE 1 is a side elevational view of a block making machine equipped with the quality control apparatus of this invention and illustrating the feed drawer in the machine in the discharging position therefor.
Figure 2:
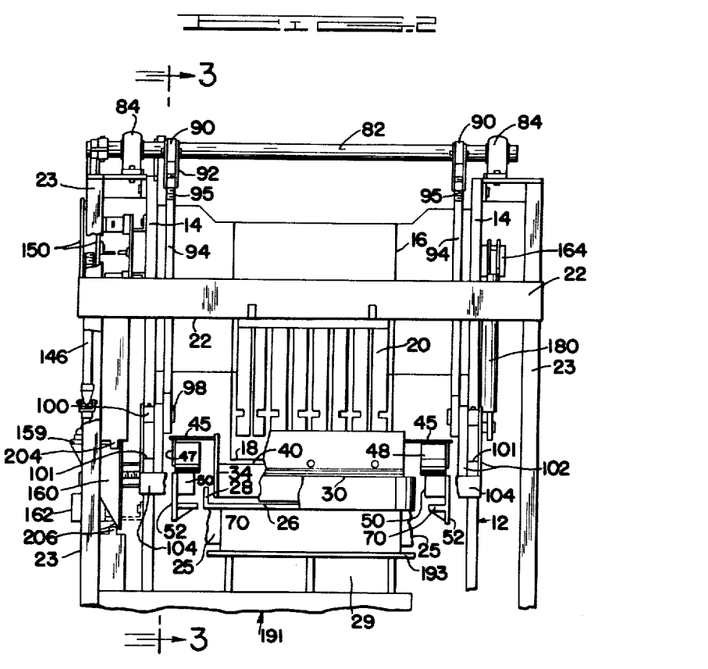
FIGURE 2 is a front view of the machine of this invention, with some parts removed to better illustrate the quality control apparatus.

With reference to the drawing, the block making machine of this invention, indicated generally at 10, is illustrated in FIGS. 1 and 2 as including a main frame 12 which includes a pair of upright horizontally spaced side frame members 14. An upright hopper 16, adapted to be supplied from any suitable source with a concrete mix, is mounted on the main frame 12 at a position between the side frame members 14 and is formed with an open lower discharge end 18. A pressure head 20, of conventional construction, is positioned at the forward end of the main frame 12 and is mounted on a subframe member 22 which is guidably mounted for up and down movement on a pair of upright bars 23 carried by the main frame side members 14. Suitable power mechanism (not shown) is provided for raising and lowering the pressure head 20. A mold, indicated generally at 24, carries transverse frame members 25 which are mounted on substantially horizontal portions 27 of the side frame members 14 at the front end of the machine 10. The mold 24 is of conventional construction and includes an open top wall member 26 and side wall members 28 and a front wall member 30 which project upwardly above the open top wall member 26. The bottom end 29 of the mold 24 is also open so that blocks molded therein can be removed in the conventional manner through the open bottom end 29.

A feed drawer 32 having side walls 34 and an adjustable front wall or plate 36 is movable between a charging position (FIGS. 3 and 8) in which it is charged with concrete mix from the hopper 16 and a discharging position (FIGS. 4 and 7) in which it discharges its contents into the mold 24. A wiper strip 49, formed of rubber or the like, is secured to and extends upwardly from the front plate 36 so that it wipes the underside of the pressure head 20 during movement of the feed drawer 32 from its discharging to its charging position. In the charging position of the feed drawer (FIG. 3) a chamber 38 formed in the feed drawer 32 between the side walls 34 and the front wall 36 and a back wall 40, is vertically aligned with the lower outlet end 18 of the hopper 16. In the discharging position of the feed drawer 32, the chamber 38 is positioned above and in substantially vertical alignment with the mold 24. In this position of the feed drawer 32, a rearwardly extending extension plate 42 which extends rearwardly from the rear wall 40 is positioned below and closes the outlet opening 18 of the hopper 16. A track or runner plate 44 is secured to and positioned between rearward extensions 46 of the feed drawer 32 for a purpose to appear presently.

Figure 5:
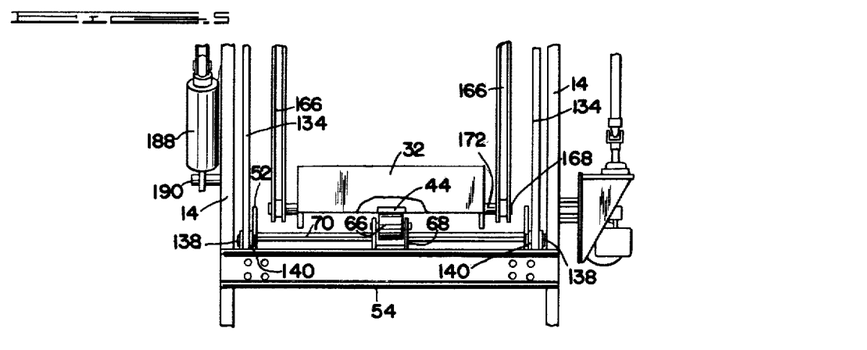
FIGURE 5 is a fragmentary rear view of a portion of the machine of this invention.
Figure 6:
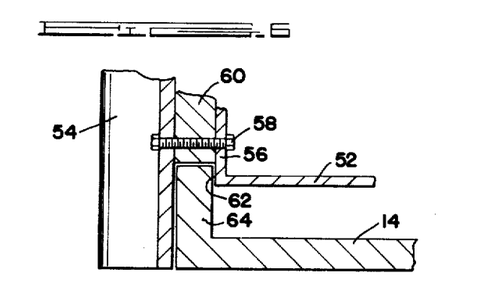
FIGURE 6 is an enlarged fragmentary vertical sectional view of a portion of the machine of this invention as seen from the line 6—6 in FIG. 1.

Adjacent the front end of the feed drawer 32, a pair of substantially horizontal side plates 45 are secured to the feed drawer side walls 34. A pair of side rollers 48 are mounted on support plates 47 which depend from the plates 45 at a position spaced from the feed drawer side plates 34. The rollers 48 ride on a pair of side tracks 50 positioned inwardly of and adjacent the frame side members 14. Each of the tracks 50 is supported on an upright frame plate 52 which extends rearwardly of the main frame 12 and the rear ends of the plates 52 are connected by a channel member 54. The frame plates 52 and the channel 54 thus constitute a frame assembly mounted on the main frame 12 for supporting the feed drawer 32. Each of the frame plates 52 is formed with an inwardly directed rear end flange 56 which is secured by bolts 58 to the channel member 54, and a spacer plate 60 is interposed between the flange 56 and the channel 54 to provide a guideway or space 62 between the channel member 54 and the flange 56. The adjacent side frame member 14 is provided with an inwardly directed flange 64 which projects into the space 62 to provide for a slidable support of the rear ends of the frame plates 52 and the channel member 54 on the side frame members 14 as shown in FIG. 6. A roller 66 is rotatably supported on a mounting bracket 68 secured to the channel member 54 substantially midway between its ends. As shown in FIGS. 3 and 5, the feed drawer track plate 44 rests on the roller 66.

It can thus be seen that the frame plates 52 support the front track members 50 and the rear roller 66 which in turn support the feed drawer 32 during its reciprocal movement between the charging and discharging positions shown in FIGS. 3 and 4, respectively. A horizontal feed table 70 is secured to and extended between the frame plates 52 at a position in substantially horizontal alignment with the mold top wall member 26. The feed table 70 closes the lower end of the feed drawer chamber 38 when the chamber is being filled with concrete mix in the charging position of the feed drawer 32. During movement of the feed drawer 32 from its charging to its discharging position, the concrete mix in the chamber 38 is moved substantially horizontally across the feed table 70 on to the top wall 26 of the open top mold 24 and thence into the mold cavity. To eliminate spillage of concrete onto the floor beneath the machine 10, there should be a minimum gap between the front edge 74 of the feed table 70, which is provided with a stiffener rib 72, and the rear edge 76 of the mold top wall 26. However, it is impossible to prevent the occurrence of some gap between the adjacent edges 74 and 76 since the mold 24 is vibrated while it is being filled and this vibration causes some wear of the feed table front edge 74. To keep this gap as small as possible, therefore, it is desirable to maintain the feed table edge 74 as close as possible to the mold box rear edge 76 during any adjustment of the position of the feed table 70 and this is accomplished in the machine of this invention in a manner to be presently described.

Figure 7:
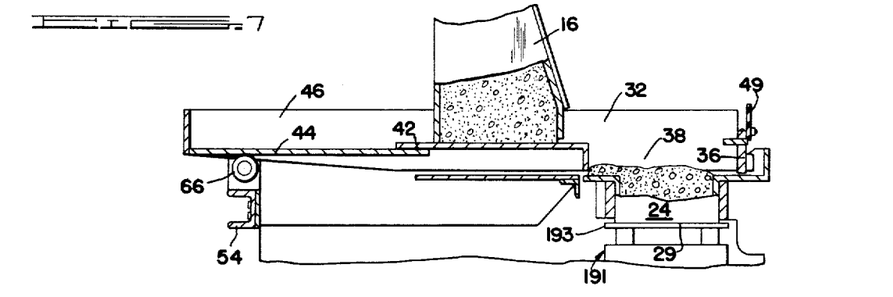
FIGURES 7 and 8 are fragmentary sectional views showing the feed drawer in the discharging and charging positions therefor, respectively, and illustrating the scraping action of the feed drawer front plate to control the amount of mix remaining in the mold after charging.
Figure 8:
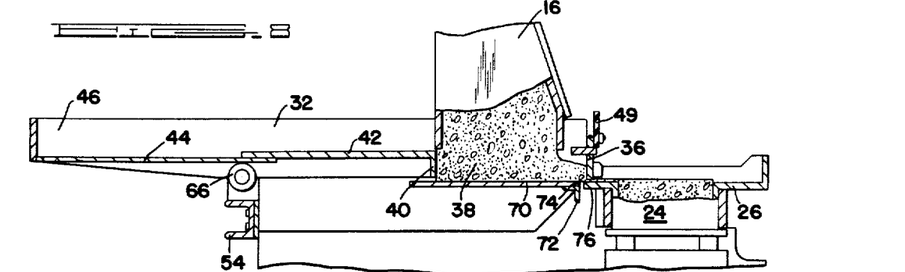

In the normal operation of the machine 10, the feed drawer 32 is continuously reciprocated between its charging position (FIG. 3) and its discharging position (FIG. 4). During movement to its discharging position, the feed drawer 32 transports the concrete mix in the chamber 38 across the feed table and deposits it into the open upper end of the mold 24. During return movement of the feed drawer 32 toward its charging position, the lower end of the feed drawer front plate 36 moves rearwardly across the open upper end of the mold 24 and acts to scrape off excess material from the mold 24 as shown in FIGS. 7 and 8 so that this material is returned to the chamber 38 when the feed drawer 32 returns to its charging position. The feed drawer front plate 36 thus acts to regulate the amount of concrete mix which remains in the mold 24 to form the desired concrete blocks. However, the mix will normally vary somewhat in density during operation of the machine 10. As a result if the mix is too fluid and soft, a given volume of mix will produce a block which is of a density lower than desired, and if the mix is too stiff and firm the block may be of a greater density than desired, so that the blocks produced in a machine will be of non-uniform density and strength. To compensate for this variation in the density of the mix supplied to the feed drawer 32, quality control apparatus, indicated generally at 80, is assembled with the machine 10 for automatically raising the feed drawer 32 relative to the mold 24 in response to a supply of concrete of a low density to the mold 24 and for lowering the feed drawer 32 relative to the mold 24 in response to a supply of concrete of a greater density to the mold 24. Such adjustment of the feed drawer 32 not only insures blocks of uniform density but also provides for mix quantities which can be compacted within predetermined time limits to thereby provide for a uniform production rate of the machine 10.

The apparatus 80 includes a front rock shaft 82 which is journaled in pillow blocks 84 mounted on the top side of the main frame 12 adjacent the front end thereof. A rear rock shaft 86 is journaled in a pair of pillow blocks 88 mounted on the top side of the main frame 12 adjacent the rear end thereof. The front rock shaft 82 carries a pair of horizontally spaced rocker arms 90 which extend forwardly from the shaft 82 and are pivotally connected at their outer ends by pins 91 to a pair of downwardly extending mounting plate assemblies 92. A link 94 having an upper end threaded portion 95 is threadably mounted in the lower end of each of the plate assemblies 92. The lower end of each link member 94 is mounted on a horizontal pivot pin 98 which is rotatably mounted in a bearing sleeve 100 carried by the upper ends of a pair of horizontally spaced support plates 102 which are secured at their lower ends by an angle member 104 to the front end of a track 50. Forwardly projecting portions 101 of the main frame side members 14 project into the spaces between the support plates 102 so as to guide the up and down movement of the plates 102. Thus, on up and down movement of the rocker arms 90, the links 94 are movable up and down to also move the tracks 50 up and down.

An elongated arm 106 is attached at one of its ends to one end of the rock shaft 82 and at its opposite end is connected by a pivot pin 108 to the upper end of a link 110. The lower end of the link 110 is pivotally connected by means of a pin 112 to a connecting plate 114. A similar elongated arm 116, secured at one of its ends to one end of the rock shaft 86, is pivotally connected at its opposite end by a pin 118 to the upper end of a link 120 which is positioned in a side-by-side relation with the link 110. The lower end of the link 120 is also pivotally connected by means of a pin 122 to the connecting plate 114.

The rock shaft 86 is provided, adjacent its ends, with a pair of rocker arms 124, each of which is pivotally connected by means of a pivot pin 126 to a connecting plate assembly 128. Each connecting plate assembly 128 is provided at its lower end with an upwardly extending threaded opening 130 in which the threaded upper end portion 132 of a link 134 is threaded. The lower end of each link 134 is secured to a pivot pin 138 which is pivotally supported in a bracket 140 secured to the channel member 54 which supports the rear roller 66.

As shown in FIG. 1, the elongated arm members 106 and 116 are of substantially equal effective lengths. In other words, the distance between the pivot pin 108 and the rock shaft 82 is substantially equal to the distance between the pivot pin 118 and the rock shaft 86. Likewise, the front rocker arms 90 are substantially equal in length to the rear rocker arms 124 so that the distance between the rock shaft 82 and each pivot pin 91 is substantially equal to the distance between the rear rock shaft 86 and each of the rear pivot pins 126. Consequently, any up or down movement of the connecting plate 114 produces a movement in the opposite direction of the links 94 and 134 and any up or down movement of the link 94 is substantially equal to the corresponding movement of the link 134. As a result, for any up or down movement of the connecting plate 114, the tracks 50 and the rear roller 66 are moved the same amount and in the same vertical direction to thereby produce translatory movement of the feed drawer 32 in a vertical direction to in turn adjust the position of the feed drawer front plate 36 with respect to the top wall 26 of the mold 24.

The connecting plate 114 is movable up and down in response to actuation of an extensible and retractible screw and nut assembly 144 which includes an elongated screw member 146 threadably mounted in an elongated nut unit 148. The nut unit 148 includes a pair of horizontally spaced bars 150 which are secured at their upper ends to the connecting plate 114 and at their lower ends support a nut member 152 which threadably supports the screw 146. The lower end of the screw 146 is connected, by means of a universal joint 154, to the upper end of a drive shaft 156 which is rotatably mounted in a bearing 158 carried by a flange 159 on a mounting plate 160 secured to one of the frame side members 14. The shaft 156 is driven by a reversible electric motor 162 mounted on the mounting plate 160. On rotation of the electric motor 162 in one direction, the shaft 156 is driven to advance the screw 146 in the nut unit 148 to thereby move the connecting plate 114 downwardly and swing the rocker arms 90 and 124 upwardly to in turn move the tracks 50, the rollers 66 and the feed drawer 32 upwardly. Conversely, on rotation of the shaft 156 in an opposite direction, the screw 146 is retracted relative to the nut assembly 148 to provide for an upward movement of the connecting plate 114 with a consequent downward swinging movement of the rocker arms 90 and 124 to provide for a downward movement of the feed drawer 32.

The feed drawer 32 is reciprocated between its charging and discharging positions in response to rotation of a shaft 164 rotatably mounted on and extended between the main frame side members 14. The shaft 164 carries a pair of downwardly extending arms 166 which are pivotally connected at their lower ends by means of pins 168 to the rear ends of adjustable arm assemblies 170 which are pivotally connected at their front ends by pins 172 to transversely opposite sides of the feed drawer 32. Thus, on rotation of the shaft 164 to move the arms 166 to the position shown in FIG. 3, the feed drawer 32 is moved rearwardly to its charging position and on rotation of the shaft 164 to move the arms 166 to the position shown in FIG. 4, the feed drawer 32 is moved forwardly to its discharging position.

Adjacent one end, the shaft 164 is secured to a rocker arm 174 which is pivotally connected at one of its ends by a pin 176 to the piston rod 178 for a hydraulic cylinder assembly 180 which is secured by a pivot member 182 to the main frame 12. The opposite end of the rocker arm 174 is connected by a pin 184 to the piston rod 186 for a hydraulic cylinder assembly 188 which is mounted on a pivot pin 190 carried by the main frame 12. The cylinder assembly 180 constitutes a "feed drawer forward cylinder assembly" since it is operable on extension to rotate the rock shaft 164 so as to move the feed drawer 32 forwardly. The cylinder assembly 188 constitutes a "feed drawer back cylinder assembly" since it is operable on extension to rotate the shaft 164 so as to move the feed drawer 32 rearwardly.

A limit switch actuating arm 199 is mounted on the shaft 164 adjacent its opposite end and carries an actuating rod 189 that, in the discharging position of the feed drawer 32, actuates a limit switch LS–2, as shown in FIG. 1, and on movement of the feed drawer 32 rearwardly to its charging position actuates a limit switch LS–3 mounted on the main frame 12.

In the operation of the machine 10 with the quality control apparatus 80, assume that a mold 24 has been placed in the position shown in FIG. 1, the feed drawer 32 has moved forwardly to its discharge position in which LS–2 has been actuated, and that in response to such actuation an agitator mechanism (not shown) has been operated to agitate the feed drawer 32 so that the charge of material therein has fallen into the open upper end of the mold 24. Further assume that the mold 24 has been vibrated by a vibrator mechanism (not shown) so that as the material is falling into the open upper end of the mold 24 it is being partially compacted as a result of the vibration of the mold. After a predetermined time, the feed drawer 32 is moved rearwardly so that the front plate 36 cuts off the excess material projecting above the mold 24 and returns to its charging position in which LS–3 is actuated. In response to actuation of LS–3, the pressure head 20 is moved downwardly into the mold 24 so as to compact the material therein.

Figure 9:
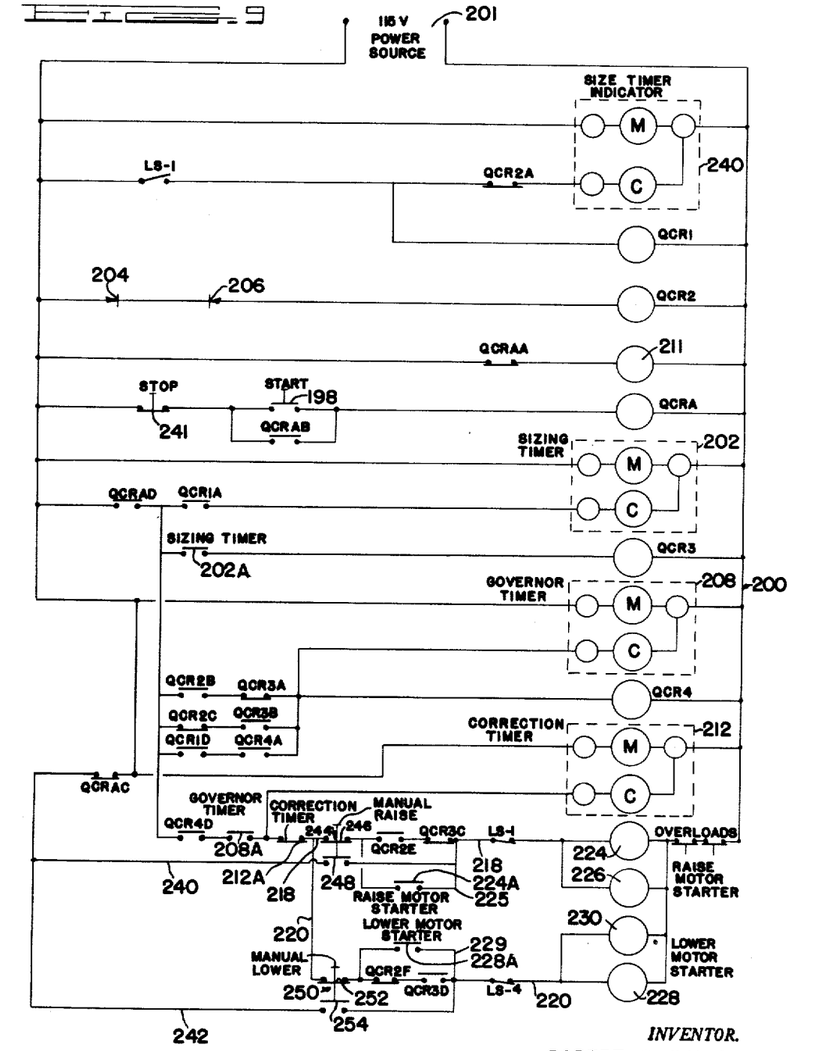
FIGURE 9 is a circuit diagram showing the control circuit for the quality control apparatus of this invention.

Further assume that the quality control start switch 198 in the quality control circuit, indicated generally at 200 in FIG. 9 and connected to a suitable source 201 of current, has been closed. The circuit 200 includes three adjustable motor driven timers of conventional construction, namely, a sizing timer 202, a governor timer 208, and a correction timer 212. Each of the timers includes a motor "M" which runs continuously and a clutch coil "C," and when the coil "C" is energized, the motor operates after a preset period to either open or close a set of points or contacts associated therewith. A size time indicator 240, similar to the timers 202, 208 and 212, operates during the time its coil "C" is energized to move a pointer along a dial to indicate in seconds the length of time its coil is energized. The timing devices 202, 208, 212 and 240 are preferably mounted on a control panel (not shown) disposed adjacent the machine 10.

The sizing timer 202 in the circuit 200 is set to provide for a compaction of the material in the mold 24 sufficient to provide a concrete block of the desired size and density. On closing of the switch 198, the coil QCRA is energized to provide for closing of the normally open locking contacts QCRAB to maintain coil QCRA energized. Also in response to energizing of the coil QCRA, the normally open contacts QCRAD are closed and the normally closed contacts QCRAA and QCRAC are opened. When contacts QCRAA are opened an indicator light 211 in series therewith goes out to indicate that the circuit 200 is in operation.

When LS–3 is closed by movement of the feed drawer 32 to its charging position, the coil QCR1 is energized. This results in closing of the normally open contacts QCR1A which are in series with the contacts QCRAD which are now closed, so that a circuit is completed through the coil "C" for the sizing timer 202 to start the timer. When the timer 202 finishes its selected time, the normally open sizing timer contacts 202A are closed so that the coil QCR3 is energized. When the coil QCR3 is energized, the normally closed contacts QCR3A and QCR3C are opened and the normally open contacts QCR3B and QCR3D are closed.

The machine 10 carried a pair of vertically aligned sizing rods 204 and 206 which are mounted on the machine main frame 12 for up and down movement. The sizing rod 204 is carried by the pressure head subframe 22 and moves up and down with the pressure head 20 at a position adjacent one of the guide bars 23. The sizing rod 206 is mounted on a pallet receiver assembly 191 which is mounted below the mold 24 and operates to maintain a pallet 193 in position against the lower open end 29 of the mold 24 until the pressure head 20 has moved downwardly in the mold 24 a distance sufficient to provide for a molded block of a desired size and has compacted the concrete in the mold 24 sufficiently to move the sizing rod 204 downwardly into engagement with the sizing rod 206. At such time the power mechanism which moves the pallet assembly 191 up and down, and which is conventional and is therefore not illustrated, moves the assembly 191 and the pallet 193 downwardly at substantially the same rate that the pressure head 20 is moving downwardly through the mold 24 so that the blocks molded therein are moved downwardly with the lowered pallet 193. The pallet with the uncured blocks thereon is moved by the assembly 191 onto a carrier (not shown) and the assembly 191 then moves an empty pallet 193 to a position against the open bottom end 29 of mold 24.

When the sizing rod 204 engages the sizing rod 206 a circuit is completed through coil QCR2. On energization of the coil QCR2, the normally open contacts QCR2B and QCR2E are closed and the normally closed contacts QCR2A, QCR2C and QCR2F are opened.

Thus, in the event the contacts QCR2B are closed before the contacts QCR3A are opened, which occurs when the sizing rods 204 and 206 make contact before the sizing timer 202 has timed out, indicating that the density of the concrete in the mold 24 is too low, a circuit is completed through the coil for the governor timer 208 so that the governor timer 208 begins timing. In the event the contacts QCR3B are closed before the contacts QCR2C are opened, which occurs when the sizing timer 202 times out before the sizing rods 204 and 206 have come into contact, indicating that the density of the mix in the mold 24 is too high to provide a block of the desired quality, a circuit will be completed through the governor timer 208 so that the governor timer 208 begins timing.

Concurrently with a completion of a circuit through the governor timer 208, the coil QCR4 is energized resulting in closing of the normally open contacts QCR4A which are in series with the normally open contacts QCR1D which are now closed since the coil QCR1 has been energized on closing of LS-3 by the actuating rod 189. Closing of the contacts QCR1D and QCR4A locks in the governor timer 208 so that it will complete its timing operation irrespective of the condition of the contacts QCR2B, QCR2C, QCR3A and QCR3B.

When the governor timer 208 times out, the normally open governor timer contacts 208A are closed. The contacts 208A are in series with the normally open contacts QCR4D which are now closed as a result of energization of the coil QCR4. As a result, a circuit is completed through the contacts QCR4D, QCR4D and 208A and the coil for the correction timer 212. Since the normally closed correction timer contacts 212A, which remain closed until the correction timer 212 times out, are now closed, current can also flow through the contacts 214 to either a "feed drawer raise" line 218 or a "feed drawer lower" line 220, which are connected in parallel, depending on the occurrence of events which determine whether the motor 162 will be operated to raise or lower the feed drawer 32 in a manner to be now described.

In the line 218, a starter coil 224 is connected in series with a set of normally open contacts QCR2E and a set of normally closed contacts QCR3C and the coil 224 is operable when energized to start the motor 162 so as to rotate the shaft 156 in a direction to raise the feed drawer 32. A light 226 is connected in parallel with the starter coil 224 so as to visually indicate to the operator of the machine that the motor 162 is being operated to raise the feed drawer 32. When the coil 224 is energized, a set of normally open contacts 224A are closed. The contacts 224A are located in a line 225 which is connected to the line 218 so as to by-pass the contacts QCR2E and QCR3C, and when the contacts 224A are closed, they maintain the coil 224 energized irrespective of the open or closed condition of the contacts QCR2E and QCR3C.

In the line 220, a motor starter coil 228 is connected in series with a set of normally closed contacts QCR2F and a set of normally open contacts QCR3D and is operable when energized to start the motor 162 so as to rotate the shaft 156 in a direction to lower the feed drawer 32. In response to energizing of the coil 228 a set of normally open contacts 228A are closed. The contacts 228A are disposed in a line 229 which is connected to line 220 so as to by-pass the contacts QCR2F and QCR3D so that when contacts 228A are closed the coil 228 remains energized irrespective of the open or closed condition of the contacts QCR2F and QCR3D. A light 230 is connected in parallel with the coil 228 so as to visually indicate to the operator of the machine 10 when the motor 162 is being operated to lower the feed drawer 32.

In the circuit 200, the determination as to which of the coils 226 or 228 will be energized is determined by which of the coils QCR2 or QCR3 is energized first. If the coil QCR2 is energized first, it indicates that the block being molded has been sized in a time which is too short relative to a desired sizing time to obtain a block of the desired quality, and if the coil QCR3 is energized first, it indicates that the sizing time has been too long with respect to the desired sizing time. If the coil QCR2 is energized first, the normally closed contacts QCR2F are opened, to prevent energizing of "lower motor starter coil 228," and the normally open contacts QCR2E are closed. Consequently, the "raise motor starter coil 224" is energized to raise the feed drawer 32 to thus provide for a cutoff of less concrete from the mold 24 when the feed drawer 32 next returns from a discharging position to a charging position. This will result in a deposit of a greater amount of mix in the mold 24 with a consequent longer time requirement for the sizing rods 204 and 206 to engage during the next molding operation.

If the coil QCR3 is energized first, the normally open contacts QCR3D are closed before the normally closed contacts QCR2F are opened so that the "lower motor starter coil" 228 is energized and the normally closed contacts QCR3C are opened to prevent energization of the raised motor starter coil 224. Consequently, during the next mold filling operation, the feed drawer front plate 36 cuts off more concrete from the concrete in the mold 24 to thus provide a block of reduced density which can be sized in the time closer approximating the desired sizing time.

Whenever the starter coils 224, 228 are energized, the motor 162 continues to operate until the correction timer 212 times out so as to open the correction timer contacts 212A which are in series with the coils 224 and 228. The correction timer is normally set to time out after the expiration of a relatively short time, for example, about one second, so that the up and down adjustment of the feed drawer 32 is accomplished in small increments to avoid overadjustment.

The nut unit 148 in the screw and nut assembly 144 which effects up and down movement of the feed drawer 32 in response to operation of the motor 162 carries an actuating arm 232 which is engageable with a limit switch LS-1 in an extreme upper position of the feed drawer 32 and with a limit switch LS-4 in an extreme lowered position of the feed drawer 32. The limit switch LS-1 is connected in the line 218 in series with the raise motor starter coil 224 and the limit switch LS-4 is connected in the line 220 in series with the lower motor starter coil 228. The limit switches LS-1 and LS-4 thus prevent raising and lowering of the feed drawer 32 beyond what is considered desirable limits since on opening of the switch LS-1 by the actuating arm 232, the raising movement of the feed drawer 32 is terminated and on engagement of the arm 232 with the switch LS-4 the lowering movement of the feed drawer 32 is terminated.

Since almost every cycle of the block machine 10 will tend to deviate to some degree in sizing time, due to minor variations in the consistency of the mix supplied to the feed drawer 32, it is desirable to eliminate a hunting condition on the part of the quality control circuit 200 to control the vertical position of the feed drawer 32 to compensate for mix variations which are considered too minor to warrant correction in the height of the feed drawer 32. The governor timer 208 functions to eliminate this hunting condition in the quality control circuit 200. The governor timer 208 is set for a time period corresponding to a sizing time variation which does not require correction, for example, about one-half of one second. In the event the time difference for the elapse of time between closing of the sizing rods 204 and 206 and timing out of the sizing timer 202 is less than the time period for which the governor timer 208 is set, the governor timer coil is de-energized before it times out and closes the contacts 208A, thereby preventing flow of current to either of the lines 218 or 220 to effect an adjustment of the position of the feed drawer 32.

When the pressure head 20 is raised and feed drawer 32 is moved forwardly, so as to open the switch LS–3, the coils QCR2 and QCR1 are de-energized to place the control circuit 200 in condition for a repeat of the above cycle of operation as soon as the feed drawer 32 has returned to its charging position to again close the switch LS–3.

The size time indicator 240, which is connected in series with the switch LS–3 and the normally closed contacts QCR2A, begins timing as soon as the switch LS–3 is closed and ceases timing when the normally closed contacts QCR2A are opened in response to engagement of the sizing rods 204 and 206. The indicator 240 thus provides a visual indication of actual sizing times.

When the quality control circuit 200 is opened by opening a stop switch 241, the coil QCRA is de-energized so that the normally closed contacts QCRAC are closed to provide for flow of current to a pair of branch lines 240 and 242. The line 240 is connected to the by-pass line 225 so as to by-pass the contacts 224A, and the line 242 is connected to the line 220 so as to by-pass the by-pass line 229. A "manual raise" switch 244 has a set of normally closed contacts 246 located in the line 218 and a set of normally open contacts 248 in the line 240. When the switch 244 is manually operated the contacts 246 are opened and the contacts 248 are closed to complete a circuit through the line 240 to the coil 224 so as to energize the coil 224 to provide for raising of the feed drawer 32. A manual lower switch 250 is also operable when actuated to open a set of normally closed contacts 252 in line 220 and close a set of normally open contacts 254 in line 242 to provide for flow of current through the lines 240 and 220 to energize the coil 228 and provide for lowering of the feed drawer 32. Also, when the stop switch 241 is opened, so that the coil QCRA is de-energized, the contacts QCRAA are closed to complete a circuit through the warning light 211, and the normally open contacts QCRAD are opened to prevent operation of the sizing timer 202.

From the above description it is seen that this invention provides a block making machine 10 which is provided with quality control apparatus 80 controlled by circuit 200 to automatically adjust the position of the feed drawer 32 relative to the mold 24. In response to actuation of the quality control apparatus 80, the feed drawer 32 is moved vertically to adjust the position of the front scraper plate 36 on the feed drawer relative to the open top end 26 of the mold 24 so as to thereby control the amount of mix which remains in the mold 24 after the feed drawer 32 has returned to its charging position for receiving another charge of mix. The feed drawer 32 reciprocates back and forth between its charging and discharging positions shown in FIGS. 3 and 4 in a substantially horizontal direction and as used herein in this connection, the term substantially horizontal is inclusive of exactly horizontal and a movement of the feed drawer 32 in which it moves forwardly and slightly upwardly during travel between its charging and discharging position. Such an inclined movement is desirable in some cases because it provides for a more uniform distribution of the mix in the mold 24. Since the feed drawer 32 moves across the rear side of the mold 24 before it moves across the front side of the mold 24, there is a tendency for it to deposit more mix in the mold adjacent the rear side than at the front side. By inclining the feed drawer 32 relative to the mold top wall 26, more of the mix is removed by the feed drawer front wall 36 from the rear side of the mold than from the front side during return movement of the feed drawer 32 to its charging position since the front plate 36 moves closer to the mold top wall 26 adjacent the rear side of the mold than it does adjacent the front side of the mold. Consequently, a more uniform distribution of the mix in the mold may be achieved by inclining the direction of movement of the mold drawer 32.

In the machine 10, the desired direction of movement of the feed drawer 32 relative to the mold 24 is readily obtained by adjustment of the threaded links 94 and 134 in the supporting plate assemblies 92 and 128, respectively. Once this adjustment is made, the desired relationship of the feed drawer 32 to the mold 24 is maintained constant during operation of the machine 10 and during vertical translatory movement of the feed drawer 32 to maintain a desired quality of blocks being manufactured. This desirable advantage is achieved by virtue of the translatory up and down movement of the mold box 32 which is effected to adjust the quality of the blocks being manufactured. Also, since the feed table 70 moves up and down with the feed drawer tracks 50, it is maintained in a constant relationship with respect to the bottom end of the feed drawer chamber 38 so that a constant clearance is maintained between the bottom end of the chamber walls and the feed table 70 thereby minimizing the amount of material which is merely pushed back and forth on the feed table 70 and ultimately pushed onto the floor under and around the machine 10. Also, since the feed table 70 merely moves up and down with respect to the mold 24, without any rotation relative to the mold 24, any gap between the feed table 70 and the mold top wall 26 is maintained at a minimum.

It will be understood that the block molding machine which is herein disclosed and described is presented for purposes of explanation and illustration and is not intended to indicate the limits of the invention, the scope of which is defined by the following claims.

What is claimed is:

1. In a block molding machine which includes a main frame, an open top mold, an open bottom feed drawer mounted on said main frame for reciprocating movement between a charging position to one side of said mold and a discharging position disposed above said mold, and plate means on said feed drawer adjacent one end thereof movable substantially horizontally across the open top of said mold during movement of said feed drawer from said discharging position to said charging position to remove excess material deposited in said mold from said feed drawer when the feed drawer was in said charging position; means for adjusting the vertical position of said plate means relative to said mold to thereby control the amount of excess material removed from said mold by said feed drawer during movement thereof toward said charging position, said adjusting means comprising coacting track and roller means on said main frame and said feed drawer supporting said feed drawer for said reciprocal movement, a pair of rock shafts rotatably mounted on horizontally spaced portions of said main frame at positions vertically spaced with respect to said feed drawer and mold, rocker arms secured to said shafts, link members connected to said rocker arms and to horizontally spaced portions of said coacting track and roller means so that on rotation of said rock shafts a translatory up and down movement is imparted to said coacting track and roller means, arm members secured at one of their ends to said rock shafts and extending toward each other so that their opposite ends are adjacent each other, extensible and retractible means connected to said opposite ends of said arm members, said extensible and retractible means being operable on extension thereof to rotate said rock shafts so that said link members are moved in one direction and on retraction thereof to rotate said rock shafts so that said link members are moved in an opposite direction, and motor means operatively associated with said extensible and retractible means for selectively extending and retracting said means.

2. In a block molding machine, a main frame, an open top mold, a pressure head movably mounted on said frame above said mold for downward movement into said mold for compacting material deposited therein, an open bottom feed drawer movable back and forth substantially horizontally across the open top of said mold between a charging position to one side of said mold and a discharging position above said mold for discharging the material in said feed drawer into said mold, coacting roller and track means on said main frame and said feed drawer supporting said feed drawer for said back and forth movement, means on said feed drawer movable substantially horizontally across the open top of said mold for removing excess material deposited therein from said feed drawer, means for effecting translatory up and down movement of said coacting track and roller means to adjust the vertical position of said means on said feed drawer relative to said mold to thereby adjust the amount of excess material removed from said mold, said means for effecting translatory up and down movement of said track means comprising support means connected to horizontally spaced portions of said coacting track and roller means and adjustably mounted on said main frame for concurrent up and down movement, and means responsive to the time required for said pressure head to compact material in said mold to a predetermined level for moving said support means up and down.

3. In a block molding machine which includes a main frame, an open top mold, an open bottom feed drawer mounted on said main frame for reciprocating movement between a charging position to one side of said mold and a discharging position disposed above said mold, and plate means on said feed drawer adjacent one end thereof movable substantially horizontally across the open top of said mold during movement of said feed drawer from said discharging position to said charging position to remove excess material deposited in said mold from said feed drawer when the feed drawer was in said charging position; means for adjusting the vertical position of said plate means relative to said mold to thereby control the amount of excess material removed from said mold by said feed drawer during movement thereof toward said charging position, said adjusting means comprising coacting track and roller means on said main frame and said feed drawer supporting said feed drawer, for said reciprocal movement, a pair of rock shafts rotatably mounted on horizontally spaced portions of said main frame at positions vertically spaced with respect to said feed drawer and mold, rocker arms secured to said shafts, link members connected to said rocker arms and to horizontally spaced portions of said coacting track and roller means so that on rotation of said rock shafts said coacting track and roller means is movable up and down, and power means operatively associated with said rock shafts for selectively effecting rotation in unison thereof in directions to provide a desired vertical adjustment of said plate means relative to said mold.

4. In a block molding machine, a main frame, an open top mold, a pressure head movably mounted on said frame above said mold for downward movement into said mold for compacting material deposited therein, an open bottom feed drawer movable back and forth substantially horizontally across the open top of said mold between a charging position to one side of said mold and a discharging position above said mold for discharging the material in said feed drawer into said mold, coacting roller and track means on said main frame and said feed drawer supporting said feed drawer for said back and forth movement, means on said feed drawer movable substantially horizontally across the open top of said mold for removing excess material deposited therein from said feed drawer, means for effecting translatory up and down movement of said coacting track and roller means to adjust the vertical position of said means on said feed drawer relative to said mold to thereby adjust the amount of excess material removed from said mold, said means for effecting translatory up and down movement of said track and roller means comprising support means connected to horizontally spaced portions of said coacting track and roller means and adjustably mounted on said main frame for concurrent up and down movement, and means connected to said support means and operable to selectively move said support means vertically.

5. In a block molding machine which includes a main frame, an open top mold having a substantially horizontal top wall, an open bottom feed drawer mounted on said main frame for reciprocating movement between a charging position to one side of said mold and a discharging position disposed above said mold, and plate means on said feed drawer adjacent one end thereof movable substantially horizontally across the open top of said mold during movement of said feed drawer from said discharging position to said charging position to remove excess material deposited in said mold from said said feed drawer when the feed drawer was in said charging position; means for adjusting the vertical position of said plate means relative to said mold to thereby control the amount of excess material deposited in said mold from said feed drawer during movement thereof toward said charging position, said adjusting means comprising a frame assembly, coacting track and roller means on said frame assembly and said feed drawer supporting said feed drawer for said reciprocal movement, a substantially horizontal feed table mounted on said frame assembly and positioned adjacent said mold top wall for closing the open bottom of said feed drawer in the charging position thereof, and means mounted on said main frame and connected at a plurality of positions to said frame assembly for effecting translatory up and down movement thereof to adjust the vertical position of said plate means relative to said mold top wall.

6. In a block molding machine, a main frame, an open top mold, a pressure head movably mounted on said frame above said mold for downward movement into said mold for compacting material deposited therein, an open bottom feed drawer movable back and forth substantially horizontally across the open top of said mold between a charging position to one side of said mold and a discharging position above said mold for discharging the material in said feed drawer into said mold, coacting roller and track means on said main frame and said feed drawer supporting said feed drawer for said back and forth movement, means on said feed drawer adjacent one end thereof movable substantially horizontally across the open top of said mold for removing excess material deposited therein from said feed drawer, adjusting means for effecting translatory up and down movement of said coacting track and roller means to adjust the vertical position of said means on said feed drawer relative to said mold to thereby adjust the amount of excess material removed from said mold, said adjusting means comprising support means connected to horizontally spaced portions of said coacting track and roller means and adjustably mounted on said main frame for concurrent up and down movement, motor means on said main frame having a drive shaft, screw means connected to said support means and to said drive shaft so that on rotation of said screw means in one direction said support means is moved up and on rotation of said screw means in an opposite direction said support means is moved down, a control circuit operatively connected to said motor means, a sizing timer in said circuit, first switch means closed by said sizing timer at the expiration of a pre-set time, second switch means closed when said pressure head has compacted material in said mold to a predetermined level, and relay means in said circuit operable to provide for operation of said motor means to rotate said screw means in said opposite direction a predetermined distance in the event said first switch means is closed more than a pre-set period of time before said second switch means is closed and to provide for operation of said motor means to rotate said screw means in said one direction a predetermined distance in the event said second switch means is closed more than a pre-set period of time before said first switch means is closed.

References Cited in the file of this patent

UNITED STATES PATENTS

| | | |
|---|---|---|
| 2,686,950 | Zevely | Aug. 24, 1954 |
| 2,957,221 | Zmania et al. | Oct. 25, 1960 |
| 2,957,222 | Zmania et al. | Oct. 25, 1960 |

UNITED STATES PATENT OFFICE

CERTIFICATE OF CORRECTION

Patent No. 3,107,410

October 22, 1963

Robert O. Davis

It is hereby certified that error appears in the above numbered patent requiring correction and that the said Letters Patent should read as corrected below.

Column 11, line 54, strike out the comma; column 12, line 33, strike out "deposited in said mold from said feed drawer" and insert instead -- removed from said mold by said feed drawer --.

Signed and sealed this 5th day of May 1964.

(SEAL)
Attest:
ERNEST W. SWIDER

Attesting Officer

EDWARD J. BRENNER
Commissioner of Patents